J. A. Lee,

Cage Trap.

No. 4,113. Reissued Aug. 30, 1870.

Robert D. Mann

Lemuel W. Serrell

Atty.

Witnesses,

Chas. H. Smith

Geo. D. Walker

N. PETERS, PHOTO-LITHOGRAPHER, WASHINGTON, D. C.

United States Patent Office.

JOHN A. LEE, OF CHATTANOOGA, TENNESSEE, ASSIGNOR, THROUGH MESNE ASSIGNMENTS, TO ROBERT D. MANN.

*Letters Patent No.* 83,642, *dated November* 3, 1868; *reissue No.* 4,113, *dated August* 30, 1870.

IMPROVED ANIMAL-TRAP.

The Schedule referred to in these Letters Patent and making part of the same

*To all whom it may concern:*

Be it known that I, JOHN A. LEE, of Chattanooga, in the county of Hamilton and State of Tennessee, have invented an Improvement in Animal-Traps; and the following is declared to be a correct description thereof.

This trap is adapted to securing in a receiver or prison several animals in succession, the action of the animal upon the bait causing its capture and the simultaneous opening of a passage from the trap itself into the receiver or prison, and the passing of the animal from the first inclosure into the second causes the first inclosure or trap to be set for another animal.

This trap is adapted to fowls, fish, rats, mice, wolves or other animals.

My invention consists in a casing with openings, in combination with a second casing having openings, fitted to be revolved progressively by competent power, such as that derived from a coiled spring, and stops that are alternately liberated, so that the first partial revolution closes the opening through which the animal entered and opens an escape into the prison or receiver, and the second partial revolution closes the last-named opening and opens the entrance to the trap so as to set the same.

In the drawing—

Figure 1:
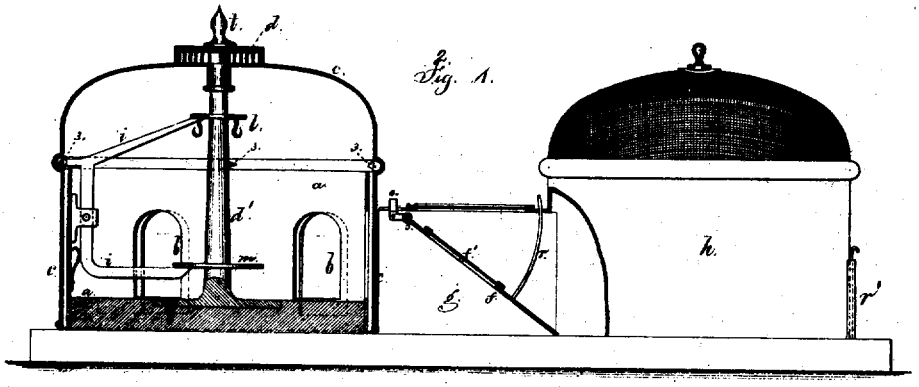
Figure 1 is a vertical section of the trap and elevation of the prison or receiver.
Figure 2:
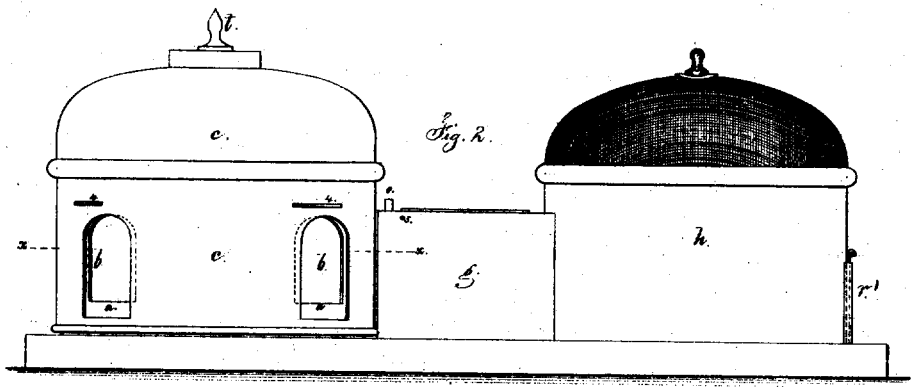
Figure 2 is an elevation of the said trap and receiver.
Figure 3:
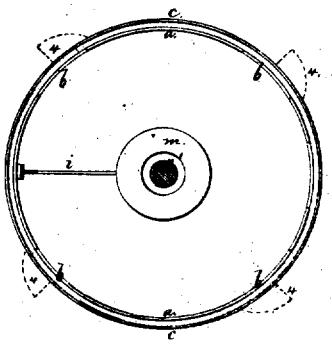
Figure 3 is a horizontal section of the trap, at the line *x x*, fig. 2.

The stationary casing *a* has openings, *b b*, in it, (one or more may be provided,) and in the center of this casing is a vertical shaft, *d'*, or stud, receiving and sustaining the revolving casing *c*, which has openings corresponding with the openings *b* in the case *a*, and a spring is shown at *d* as a motor acting to rotate the casing *c* progressively as it is unlatched by the animal.

I provide two latches or catches and two ranges of stops, corresponding each to the number of openings *b*.

The range of stops 3 act in connection with the bait-lever, and the range of stops 4 in connection with a gate, *f*, that swings in the passage *g* between the casing *a* and the prison or receiver *h*.

I have shown the bait-lever *i* as extending up to the range of hooks *l* and down to the platform *m*.

The gate *f* is shown upon a fulcrum, 5, with a glass, *f'*, in said gate, to admit light to the trap and cause the gate to appear to be a way for the escape of the animal.

This gate *f*, when raised by the animal in passing, liberates the latch *o* from the stop 4, and guards or fenders, *r*, may be provided to prevent an animal from the prison *h* getting above and obstructing the swinging of the gate *f*.

It is now to be understood that the trap is to be baited when the casing *c* has been lifted off, that the casing *c* is replaced and secured by the nut *t*, the spring *d* fitting a square upon the upper part of the column or shaft *d'*.

The spring is wound up by rotating the casing *c*, and, when the trap is set, the casing is held by the bait-lever *i*, taking one of the stops 3, and the openings in the casing *c* coinciding with those in the casing *a*.

Upon the animal stepping upon the platform *m*, or seizing the bait upon one of the hooks *l*, the stop 3 is liberated, and the case *c* revolves one-half the distance between one of the openings *b* and the nut, so that the animal is effectually inclosed in the trap.

This movement brings one of the openings in the case *c* into line with the passage *g*, so that the animal may escape through the same into the receiver or prison *h*, and, in going through that, the gate *f* is moved and the latch *o* liberated from the stop 4, so that the spring can rotate the casing *c*, closing the passage *g*, and opening the trap again for another animal to pass in.

A bag-net may be used for fish instead of the prison. The prison may have a wire-cloth top, and also a door, at *r'*, to allow the contents to be removed.

It is to be understood that both the platform *m* and hooks *l* are employed in traps for animals such as rats and mice, but the hooks only will be employed for fishes or the platform for birds.

What I claim as my invention is—

1. Two casings with openings, one stationary, the other rotated progressively, in combination with stops and latches, operated substantially as specified, for catching the animal and then resetting the trap as the animal passes into a second receiver or prison, substantially as set forth.

2. The gate *f*, swinging in the passage *g* between the trap and the receiver or prison, and acting to disconnect the stop of the trap so as to allow the trap to reset itself automatically, substantially as set forth.

3. The lever *i*, connected with the hooks *l* and platform *m*, in combination with the rotating casing *c* and stops 3, substantially as and for the purposes set forth.

4. The rotating casing *c* and stops 3, in combination with a latch or lever to arrest the movement of the casing, and a hook, *l*, or platform *m*, to be acted upon by the animal for liberating the latch or lever, substantially as set forth.

Dated this 8th day of August, A. D. 1870.

JOHN A. LEE.

Witnesses:

J. D. BLACKFORD,

H. H. KNOX.